United States Patent
Kimata et al.

(10) Patent No.: US 9,170,329 B2
(45) Date of Patent: Oct. 27, 2015

(54) OBJECT DETECTION APPARATUS FOR VEHICLE

(75) Inventors: Akihito Kimata, Wako (JP); Hiroaki Tani, Wako (JP); Yoji Sasabuchi, Wako (JP); Hiroyuki Koike, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/004,206

(22) PCT Filed: Apr. 16, 2012

(86) PCT No.: PCT/JP2012/060233
§ 371 (c)(1),
(2), (4) Date: Sep. 10, 2013

(87) PCT Pub. No.: WO2012/147548
PCT Pub. Date: Nov. 1, 2012

(65) Prior Publication Data
US 2014/0002295 A1    Jan. 2, 2014

(30) Foreign Application Priority Data

Apr. 28, 2011  (JP) .................................. 2011-100720

(51) Int. Cl.
*G01S 13/93* (2006.01)
*G08G 1/16* (2006.01)
*G01S 17/93* (2006.01)

(52) U.S. Cl.
CPC .............. *G01S 13/931* (2013.01); *G08G 1/165* (2013.01); *G08G 1/166* (2013.01); *G01S 17/936* (2013.01)

(58) Field of Classification Search
CPC .......... G01S 13/931; G01S 2013/9367; G01S 17/936; G08G 1/165; G08G 1/166
USPC ............................. 342/70–72; 356/5.01–5.08
See application file for complete search history.

(56) References Cited

U.S. PATENT DOCUMENTS 6,085,151 A * 7/2000 Farmer et al. .................. 701/301
6,198,426 B1 * 3/2001 Tamatsu et al. .................. 342/70
(Continued)

FOREIGN PATENT DOCUMENTS

JP        08-124080 A     5/1996
JP      2000-251200 A     9/2000
(Continued)

OTHER PUBLICATIONS

Internal Search Report for PCT/JP2012/060233, Mailing Date of May 29, 2012.
(Continued)

*Primary Examiner* — Matthew M Barker
(74) *Attorney, Agent, or Firm* — Westerman, Hattori, Daniels & Adrian, LLP

(57) ABSTRACT

A roadside object present at the side of a subject vehicle travel path and a preceding vehicle at a speed equal to or greater than a predetermined speed are detected based on points derived by transmitting an electromagnetic beam forward of the subject vehicle and projecting reflection points obtained onto a two-dimensional plane, a determination is made when the preceding vehicle passes near the roadside object as to whether it moved toward the travel path within a predetermined time before and after the passage, and the roadside object is not determined to be the obstacle when it is determined to have moved toward the travel path, thereby preventing the roadside object from being misidentified as the obstacle owing to erroneous recognition of it having intruded into the travel path of the subject vehicle when detecting the object using an electromagnetic beam.

5 Claims, 3 Drawing Sheets

(56) References Cited

U.S. PATENT DOCUMENTS

| | | | | |
|---|---|---|---|---|
| 6,311,123 | B1 * | 10/2001 | Nakamura et al. | 701/96 |
| 6,593,873 | B2 * | 7/2003 | Samukawa et al. | 342/70 |
| 6,684,149 | B2 * | 1/2004 | Nakamura et al. | 701/96 |
| 7,124,027 | B1 * | 10/2006 | Ernst et al. | 701/301 |
| 8,542,106 | B2 * | 9/2013 | Hilsebecher et al. | 340/435 |

FOREIGN PATENT DOCUMENTS

| | | |
|---|---|---|
| JP | 2000-318634 A | 11/2000 |
| JP | 2005-251200 A | 9/2005 |
| JP | 2008-217078 A | 9/2008 |
| JP | 2011-191238 A | 9/2011 |

OTHER PUBLICATIONS

Written Opinion for PCT/JP2012/060233, Mailing Date of May 29, 2012.

* cited by examiner

OBJECT DETECTION APPARATUS FOR VEHICLE

TECHNICAL FIELD

This invention relates to an object detection apparatus for a vehicle, more particularly to an apparatus configured to prevent erroneous detection occurring due to a roadside object or other object detected using an electromagnetic beam being transferred to a vehicle ahead of the subject vehicle.

BACKGROUND ART

It is a common practice to detect a pedestrian or other object moving laterally ahead of a traveling vehicle by utilizing points formed by transmitting an electromagnetic beam forward of the subject vehicle to obtain reflections points that are projected onto a two-dimensional plane, and the technique described in Patent Document 1 listed below is an example in this regard. This conventional technique determines whether the object is a pedestrian or the like by comprehensive consideration of its lateral velocity, position and size.

PRIOR ART REFERENCE

Patent Document

Patent Reference 1: Japanese Laid-Open Patent Application No. 2000-251200

SUMMARY OF THE INVENTION

Problem to be Solved by the Invention

However, it sometimes happens that when the vehicle ahead passes by the roadside object detected outside the travel path of the subject vehicle, the reflection points of the roadside object are dragged by the reflection points of the vehicle ahead and transferred to those of the vehicle ahead, and this transfer is sometimes erroneously recognized as lateral movement of the object.

Specifically, in a driving environment such as shown in FIG. 4A, when, as shown in FIG. 4B, the preceding vehicle passes by a pole or other roadside object detected outside the travel path of the subject vehicle, the reflection points of the roadside object are dragged by the reflection points of the preceding vehicle and transferred to those of the preceding vehicle, so that the roadside object is sometimes erroneously recognized as an obstacle that has intruded (moved laterally) into the subject vehicle travel path.

The technique described in the aforesaid Patent Document 1 has not been able to prevent such erroneous recognition because it uses the lateral velocity and the like of the objects for the detection.

Therefore, this invention is directed to overcoming the foregoing problem by providing an object detection apparatus for a vehicle that, in the case of detecting an object using an electromagnetic beam, prevents a roadside object from being erroneously recognized and determined to have intruded into the travel path of the subject vehicle.

Means for Solving the Problem

In order to achieve the object, as recited in claim 1, this invention is configured to have an object detection apparatus for a vehicle equipped with obstacle determination means that determines whether an object detected based on points derived by transmitting an electromagnetic beam forward of the subject vehicle and projecting reflection points obtained onto a two-dimensional plane is an obstacle constituting an obstruction to advance of the subject vehicle, comprising subject vehicle travel path estimation means that estimates a travel path of the subject vehicle; roadside object/preceding vehicle detection means that detects a roadside object present at a side of the travel path and a preceding vehicle traveling ahead on the travel path at a speed equal to or greater than a predetermined speed based on the derived points; and roadside object movement determination means that determines, when the preceding vehicle passes near the roadside object, whether the roadside object has moved toward the travel path within a predetermined time before and after the preceding vehicle passing near the roadside object; wherein the obstacle determination means does not determine the roadside object to be the obstacle when the roadside object is determined to have moved toward the travel path.

In the apparatus recited in claim 2, the roadside object movement determination means establishes regions at rear left and rear right of the preceding vehicle and determines whether the roadside object has moved toward the travel path within the established regions, and the obstacle determination means does not determine the roadside object to be the obstacle when the roadside object is determined to have moved toward the travel path within the regions.

In the apparatus recited in claim 3, the obstacle determination means corrects a moving speed of the roadside object to zero and corrects a position of the roadside object to a position before movement was detected when it is determined that the roadside object has moved toward the travel path.

In the apparatus recited in claim 4, the roadside object movement determination means determines a degree of width of a driving lane where the travel path of the subject vehicle is present and establishes an area of the regions based on the determined width degree.

In the apparatus recited in claim 5, the predetermined speed is a vehicle speed with the possibility of provoking transfer of the reflection points of the roadside object obtained by transmitting the electromagnetic beam to the preceding vehicle.

Effects of the Invention

As recited in claim 1, the object detection apparatus for a vehicle is configured to detect a roadside object present at a side of the travel path and a preceding vehicle traveling ahead on the travel path at a speed equal to or greater than a predetermined speed based on the derived points, determine, when the preceding vehicle passes near the roadside object, whether the roadside object has moved toward the travel path within a predetermined time before and after the passing of the preceding vehicle and not determine the roadside object to be the obstacle when the roadside object is determined to have moved toward the travel path. With this, even if the reflection points of the roadside object should be dragged by the reflection points of the preceding vehicle and transferred to those of the preceding vehicle, when the preceding vehicle passes by the roadside object, it becomes possible to prevent the transfer from being erroneously recognized as lateral movement of the object and determined to be the obstacle. Moreover, it becomes possible by this to minimize unnecessary collision avoidance control.

As recited in claim 2, the apparatus is configured to determine whether the roadside object has moved toward the travel path within the established regions, and not determine the roadside object to be the obstacle when the roadside object is determined to have moved toward the travel path within the regions. With this, in addition to the foregoing effects and advantages, it becomes possible to accurately determine whether the roadside object has moved and reliably determine whether the roadside object is the obstacle and also possible to reduce the processing required for the determination because the region to be determined can be restricted.

As recited in claim 3, the apparatus is configured to correct a moving speed of the roadside object to zero and corrects a position of the roadside object to a position before movement was detected when it is determined that the roadside object has moved toward the travel path. With this, in addition to the foregoing effects and advantages, it becomes possible to reliably monitor the roadside object concerned after passing of the preceding vehicle.

As recited in claim 4, the apparatus is configured to determine a degree of width of a driving lane where the travel path of the subject vehicle is present and establishes an area of the regions based on the determined width degree. With this, in addition to the effects and advantages, it becomes possible to establish the regions more appropriately, so that whether the roadside object has moved can be accurately determined to more reliably determine whether the roadside object is the obstacle.

As recited in claim 5, the predetermined speed is a vehicle speed with the possibility of provoking transfer of the reflection points of the roadside object obtained by transmitting the electromagnetic beam to the preceding vehicle. With this, in addition to the effects and advantages, it becomes possible to reduce the processing required for the determination to the minimum necessary.

DESCRIPTION OF THE EMBODIMENT

A mode for implementing the object detection apparatus for a vehicle according this invention is explained with reference to the attached drawings in the following.

Embodiment

Figure 1:
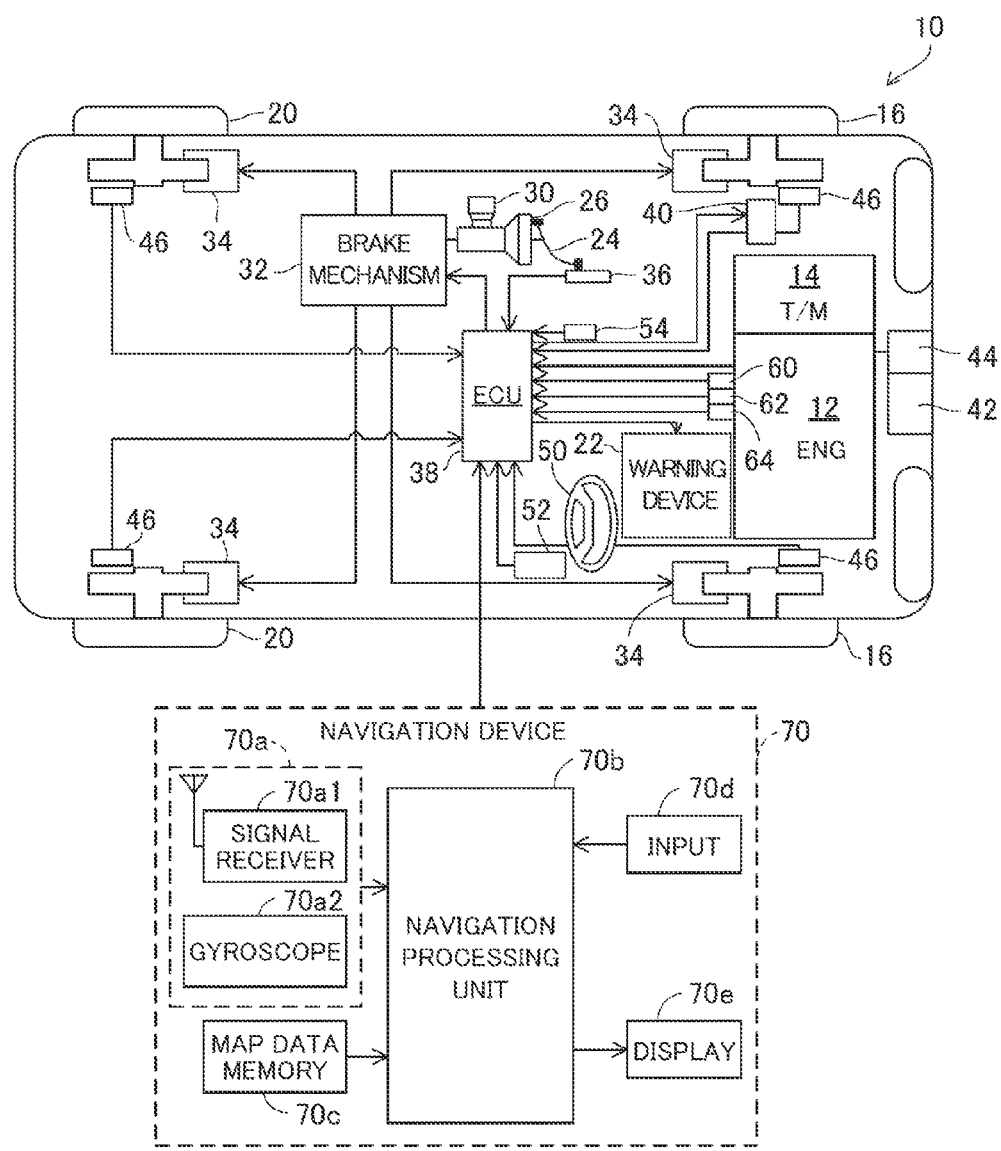
FIG. 1 is schematic diagram showing an overall view of an object detection apparatus for a vehicle according to an embodiment of this invention.

FIG. 1 is schematic diagram showing an overall view of an object detection apparatus for a vehicle according to an embodiment of this invention.

In FIG. 1, the symbol 10 indicates a vehicle (hereinafter called "subject vehicle") having a four-cylinder internal combustion engine (engine; designated "ENG" in FIG. 1) 12 installed in front. The output of the engine 12 is inputted to an automatic transmission (designated "T/M" in FIG. 1) 14. The automatic transmission 14 is a stepped automatic transmission with five forward speeds and one reverse speed that suitably regulates the transmission ratio of the output of the engine 12 transmitted to left and light front wheels 16 so as to drive the front wheels. 16 and propel the subject vehicle 10 as the left and right rear wheels 20 are made to follow.

A warning device 22 comprising an audio speaker and an indicator is installed near the driver's seat of the subject vehicle 10 for wanting the driver audibly and visually. A brake pedal 24 located on the floor at the driver's seat of the subject vehicle 10 is connected through a brake booster 26, master cylinder 30 and brake hydraulic mechanism 32 to brakes (disc brakes) 34 installed at the individual left and right front wheels 16 and rear wheels 20.

When the driver steps on the brake pedal 24, the pressing force is amplified by the brake booster 26, the master cylinder 30 uses the amplified force to generate braking pressure, and the brakes 34 installed at the individual front wheels 16 and rear wheels 20 are operated through the brake hydraulic mechanism 32 to slow the subject vehicle 10. A brake switch 36 mounted near the brake pedal 24 outputs an ON signal when the driver operates the brake pedal 24.

The brake hydraulic mechanism 32 is equipped with, inter alia, a group of electromagnetic solenoid valves interposed in oil passages connected to a reservoir, a hydraulic pump, and a motor for driving the hydraulic pump (none of which are shown). The group of electromagnetic solenoid valves is connected to an ECU (electronic control unit) 38 through a drive circuit (not shown), whereby the four brakes 34 are configured to be operated independently of one another by the ECU 38, separately of the operation of the brake pedal 24 by the driver.

Further, an electric motor 40 for steering assistance is installed near the front wheels to assist steering. Specifically, a mechanism that converts rotation of a steering wheel transmitted from a steering shaft and the like to reciprocating motion of a rack through a pinion to steer the front wheels via tie rods (not shown) is provided on its rack with the electric motor 40.

The electric motor 40 is also connected to the ECU 38 through a drive circuit (not shown). When an obstacle must be avoided by steering, the ECU 38 operates the electric motor 40 to help the driver avoid the obstacle by steering.

The front of the subject vehicle 10 is equipped with a radar (laser-scanning radar) unit 42. The radar unit 42 detects an object present ahead of the subject vehicle 10 (a preceding vehicle or other object) by transmitting a laser beam (electromagnetic beam (carrier wave)) in the forward direction of the subject vehicle 10 and receiving the laser beam reflected by the object.

The output of the radar unit 42 is sent to a radar output processing ECU (electronic control unit) 44 comprising a microcomputer. The radar output processing ECU 44 calculates the relative distance to the object by measuring the time from the transmission of the laser beam to the return of the reflected laser beam and further differentiates the relative distance to determine the velocity relative to the object. Moreover, the direction of the object is detected from the direction of the reflected beam, thereby obtaining two-dimensional data, on the object.

The output of the radar output processing ECU 44 is sent to the ECU (electronic control unit) 38. Although not illustrated, the ECU 38 is configured as a microcomputer comprising, inter alia, a CPU, RAM, ROM and I/O circuit.

Wheel speed sensors 46 are installed near the respective front wheels 16 and rear wheels 20 and output pulse signals once every predetermined rotation angle of the wheels. A steering angle sensor 52 is installed near a steering wheel 50 provided at the driver's seat of the subject vehicle 10 and produces an output proportional to the steeling angle of the steering wheel 50 input by the driver. A yaw rate sensor 54 is installed near the center of gravity of the subject vehicle 10 and produces an output proportional to the yaw rate (angular velocity) around a vertical axis (yaw axis) of the subject vehicle 10.

Further, a crank-angle sensor 60 is installed near a crankshaft (not shown) of the engine 12 and outputs a pulse signal indicating the crank angle, and a manifold absolute pressure sensor 62 is installed in an intake manifold (not shown) and outputs a signal corresponding to the absolute pressure inside the intake manifold (indicative of engine load). A throttle opening sensor 64 is installed near a throttle valve (not shown) and outputs a signal corresponding to the throttle opening.

The outputs of the aforesaid sensor group are also sent to the ECU 38. The ECU 38 counts the outputs of the four wheel speed sensors 46 and by averaging them, for example, ascertains a vehicle speed indicative of the travel speed of the subject vehicle 10, and also counts the output of the crank-angle sensor 60 to ascertain the engine speed NE.

In addition, a navigation device 70 is mounted in the subject vehicle 10. The navigation device 70 comprises a current position detection unit 70a, a navigation processing unit 70b, a map data memory unit 70c, an input unit 70d, and a display unit 70e.

The current position detection unit 70a is equipped with a positioning signal receiver 70a1 for receiving a GPS (Global Positioning System) signal or other such positioning signal and a gyroscope 70a2 for outputting a signal corresponding to the orientation in the horizontal plane or the tilt angle relative to the vertical direction of the subject vehicle 10, and calculates the current position of the subject vehicle 10 by autonomous navigation based on the received positioning signal or the outputs of the gyroscope 70a2 and wheel speed sensors 46.

The map data memory unit 70c comprises a CD-ROM or other memory medium and stores map (road) data including the width, intersections, right-turn lanes and the like of the road where the subject vehicle 10 is driving along. The input unit 70d comprises switches, a keyboard and the like, and the display unit 70e is equipped with a display.

By accessing the map (road) data stored in the map data memory unit 70c, the navigation processing unit 70b uses the display unit 70e to display, for example, the current position of the subject vehicle 10 obtained by the current position detection unit 70a or the position of the subject vehicle 10 inputted to the input unit 70d.

The navigation processing unit 70b and the ECU 38 are communicably interconnected, and the navigation processing unit 70b outputs to the ECU 38 data specifying the position on the roadmap data where the subject vehicle 10 is driving.

Figure 2:
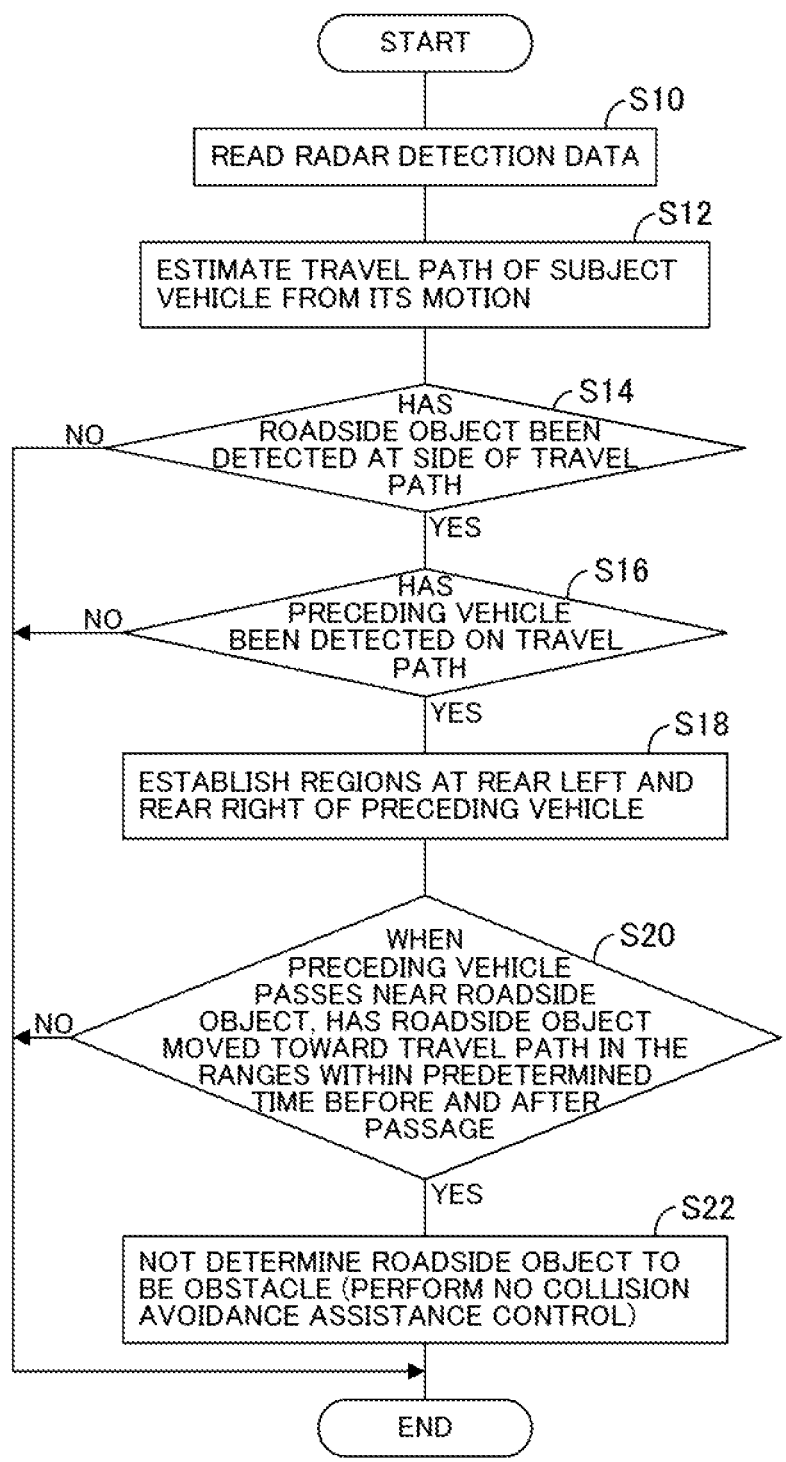
FIG. 2 is a flowchart showing the operation of the apparatus shown in FIG. 1.

FIG. 2 is a flowchart showing the operation of the apparatus shown in FIG. 1.

Now to explain, in S (Step) 10, the detection data of the radar unit 42 is read. Specifically, the radar unit 42 transmits an electromagnetic beam forward of the subject vehicle 10 as shown in FIG. 4B, and reflection points produced by the beam reflected from all objects present ahead are used to detect the objects.

Within the detection range of the radar unit 42 (indicated by symbol 42a in FIG. 4B), objects are captured or detected as reflection points of the electromagnetic beam. When these reflection points are projected onto a two-dimensional plane on scanner data comprising the forward direction (fore-aft direction) of the subject vehicle 10 and the direction orthogonal thereto (lateral direction) and stored in the memory of the radar output processing ECU 44, an object is detected as a cluster of reflection points (point cloud) because the multiple object reflection points of the object are distributed continuously close together.

Figure 4A:
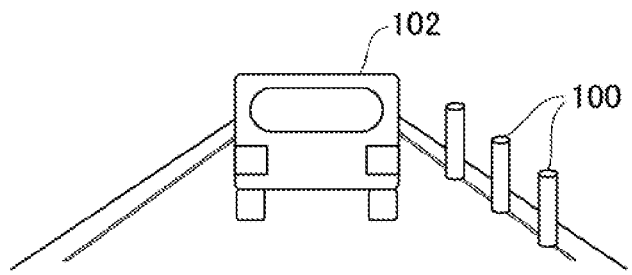
FIG. 4 is an explanatory view explaining erroneous object recognition due to transfer of the reflection points to those of a vehicle ahead that is to be solved by the processing of the FIG. 2 flowchart.
Figure 4B:
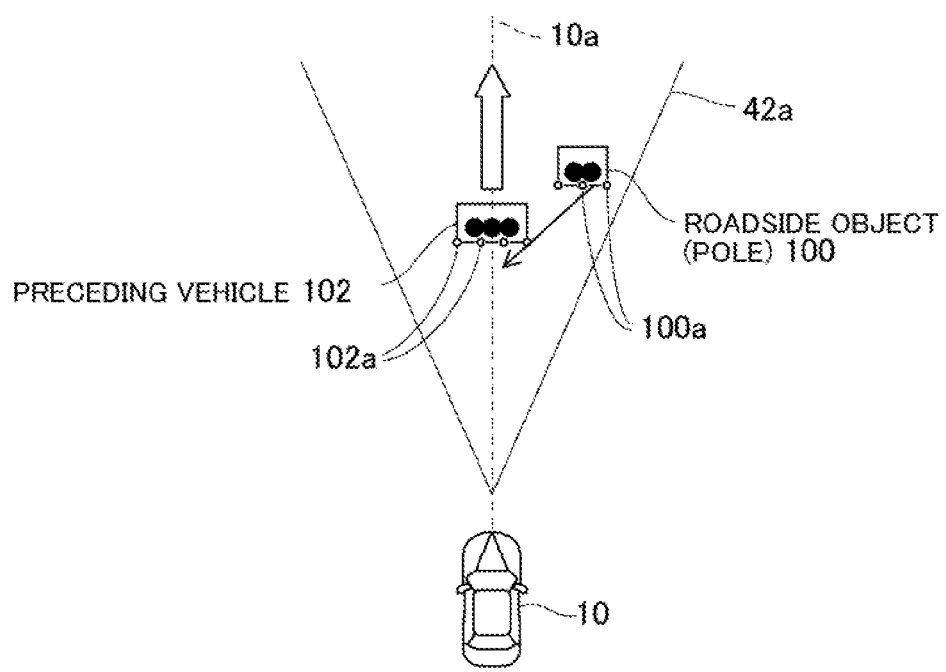

Here, to reiterate the issue addressed by this invention: in a driving environment such as shown in FIG. 4A, when, as shown in FIG. 4B, a preceding vehicle 102 passes by pole or other roadside object 100 detected outside the travel path of the subject vehicle 10, reflection points 100a of the roadside object 100 are dragged by (forced along) reflection points 102a of the preceding vehicle (vehicle ahead) 102 and transferred to those of the vehicle ahead 102, so that the roadside object 100 is sometimes erroneously recognized as obstacles that intruded (moved). The object of this invention is to overcome this inconvenience.

Returning to the explanation of the flowchart of FIG. 2, next, in S12, the vehicle speed and yaw rate of the subject vehicle 10 (the motion state of the subject vehicle) are detected from the outputs of the wheel speed sensors 46 and the yaw rate sensor 54, and the travel path 10a of the subject vehicle 10 is estimated from the detected motion state. Alternatively it is possible to acquire data regarding the road the subject vehicle 10 is driving along by accessing the map data memory unit 70c of the navigation device 70.

Next, in S14, it is determined whether a roadside object(s) 100 such as a pole has been detected at the side of the estimated travel path of the subject vehicle 10.

When the result in S14 is NO, the following processing steps are skipped and when it is YES, the program proceeds to S16, in which it is determined whether a preceding vehicle (indicated by symbol 102 in FIG. 4) has been detected on the estimated travel path 10a of the subject vehicle 10, more specifically it is determined whether a preceding vehicle 102 has been detected that is traveling ahead on the estimated travel path of the subject vehicle 10 at a speed equal to or greater than a predetermined speed.

The "predetermined speed" is a vehicle speed capable of provoking transfer of the reflection points 100a of the roadside object 100. In other words, the "predetermined speed" is a vehicle speed that might provoke transfer of reflection points 100a of the roadside object 100 obtained by transmitting the electromagnetic beam to the preceding vehicle 102.

Figure 3:
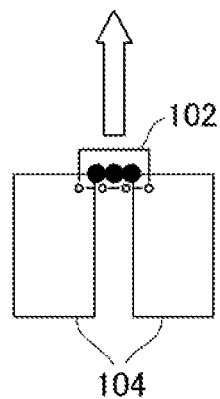
FIG. 3 is an explanatory view explaining processing of the FIG. 2 flowchart.

When the result in S16 is NO, the following processing steps are skipped, and when it is YES, the program proceeds to S18, in which regions 104 are established at the rear left and rear right of the preceding vehicle 102. As shown in FIG. 3, the regions 104 are separately established on a two-dimensional plane (on scanner data stored in a memory of the aforesaid radar output processing ECU 44) on the left and right sides reward of the preceding vehicle 102 (traveling in the direction of the arrow).

The regions 104 are divided to the left and right of the preceding vehicle 102 so as to avoid the area directly behind the preceding vehicle 102. This is for enhancing detection accuracy with consideration to the fact that the area directly behind is situated near the middle the driving lane (where the travel path 10a of the subject vehicle 10 is present) and frequently has manholes and the like installed in the road surface.

In S18, it is alternatively possible to define the area (size) of the regions 104 as a fixed value. Further, it is also possible to determine the width degree of the driving lane where the travel path 10a of the subject vehicle 10 is present by an appropriate method and define the area of the regions 104 based on the determined width degree. For example, in a case such as when the driving lane is narrow, left and right regions 104 of suitably reduced area can be defined.

Next, in S20, it is determined, when the preceding vehicle 102 passes near the roadside object (Pole) 100, whether the roadside object 100 has moved from the road side toward the travel path 10a of the subject vehicle 10, i.e., the roadside object 100 has moved laterally in the regions 104 within a predetermined time before and after the passing of the preceding.

More specifically, in S20, it is determined, when the preceding vehicle 102 passes near a roadside object (Pole) 100, whether the roadside object 100 (more exactly; its reflection points 100a) has moved (has moved laterally) within either established region 104 toward the travel path 10a of the subject vehicle 10 within the predetermined time before and after the preceding vehicle passing near the roadside object. The "predetermined time" is a very short time.

When the result in S20 is NO, the following processing steps are skipped and when it is YES, i.e., when it is determined that the roadside object 100 (more exactly its reflection points 100a) has moved toward the travel path 10a, the program proceeds to S22, in which the roadside object 100 is not determined to be an obstacle and is determined to be a stationary object.

In the case where an obstacle is determined, another routine not shown in the drawings is executed to determine the possibility of colliding with the obstacle in the travel path 10a of the subject vehicle 10 and respond to a finding that collision is possible by executing collision avoidance assistance control such as by issuing a warning with the warning device 22 (or braking by means of the brake hydraulic mechanism 32 or steering assistance by means of the electric motor 40), but no obstacle has not been determined here, so that no collision avoidance assistance control is performed.

Further, when it is determined in S22 that the roadside object 100 has moved toward the travel path 10a, the moving speed of the roadside object 100 is corrected to zero and the position of the roadside object 100 is corrected to its position before movement was detected.

As set out in the foregoing, this embodiment is configured to have an object detection apparatus for a vehicle (102) equipped with obstacle determination means (ECU 38, S10) that determines whether an object detected based on points derived by transmitting an electromagnetic beam forward of the subject vehicle (10) and projecting reflection points obtained onto a two-dimensional plane is an obstacle constituting an obstruction to advance of the subject vehicle (10), comprising: subject vehicle travel path estimation means (ECU 38, S12) that estimates a travel path (10a) of the subject vehicle (10); roadside object/preceding vehicle detection means (ECU 38, S14, S16) that detects a roadside object (100) present at a side of the travel path and a preceding vehicle (102) traveling ahead on the travel path (10a) at a speed equal to or greater than a predetermined speed based on the derived points: and roadside object movement determination means (ECU 38, S18, S20) that determines, when the preceding vehicle (102) passes near the roadside object (100), whether the roadside object (100) has moved toward the travel path (10a) within a predetermined time before and after the preceding vehicle (102) passing near the roadside object (100); wherein the obstacle determination means does not determine the roadside object (100) to be the obstacle when the roadside object (100) is determined to have moved toward the travel path (ECU 38, S22). With this, even if the reflection points of the roadside object 100 should be dragged by the reflection points of the preceding vehicle 102 and transferred to those of the preceding vehicle 102, when the preceding vehicle 102 passes by the roadside object 100, it becomes possible to prevent the transfer from being erroneously recognized as lateral movement of the object and determined to be an obstacle. Moreover, it becomes possible by this to minimize unnecessary collision avoidance control, such as the issuing of warnings by the warning device 22, braking by the brake hydraulic mechanism 32, and steeling assistance by the electric motor 40.

Further, in the apparatus, the roadside object movement determination means establishes regions (104) at rear left and rear right of the preceding vehicle (102) and determines whether the roadside object (100) has moved toward the travel path (10a) within the established regions (104), and the obstacle determination means does not determine the roadside object (100) to be the obstacle when the roadside object (100) is determined to have moved toward the travel path within the regions (S18, S20, S22). With this, in addition to the foregoing effects and advantages, it becomes possible to accurately determine whether the roadside object 100 has moved and reliably determine whether the roadside object 100 is the obstacle and also possible to reduce the processing required for the determination because the region to be determined can be restricted.

Further, in the apparatus, the obstacle determination means corrects a moving speed of the roadside object (100) to zero and corrects a position of the roadside object (100) to a position before movement was detected when it is determined that the roadside object (100) has moved toward the travel path (10a, S22). With this, in addition to the foregoing effects and advantages, it becomes possible to reliably monitor the roadside object 100 concerned after passing of the preceding vehicle 102.

Further, in the apparatus, the roadside object movement determination means determines a degree of width of a driving lane where the travel path of the subject vehicle is present and establishes an area of the regions (104) based on the determined width degree (S18). With this, in addition to the effects and advantages, it becomes possible to establish the regions more appropriately, so that whether the roadside object 100 has moved can be accurately determined to more reliably determine whether the roadside object 100 is the obstacle.

Further, in the apparatus, the predetermined speed is a vehicle speed with the possibility of provoking transfer of the reflection points of the roadside object (100) obtained by transmitting the electromagnetic beam to the preceding vehicle (S16). With this, in addition to the effects and advantages, it becomes possible to reduce the processing required for the determination to the minimum necessary.

Although the roadside object is illustrated as a pole in the foregoing, it should be noted that the roadside object is not limited to the pole but include any type whose electromagnetic beam reflection points might transfer to those of the preceding vehicle.

Further, although a laser radar unit was disclosed as the device for transmitting the electromagnetic beam, a microwave radar unit can be used instead or in addition.

INDUSTRIAL APPLICABILITY

According to this invention, a roadside object present at the side of a subject vehicle travel path and a preceding vehicle at a speed equal to or greater than a predetermined speed are detected based on points derived by transmitting an electromagnetic beam forward of the subject vehicle and projecting reflection points obtained onto a two-dimensional plane, a determination is made when the preceding vehicle passes near the roadside object as to whether it moved toward the travel path within a predetermined time before and after the passage, and the roadside object is not determined to be an obstacle when it is determined to have moved toward the travel path, thereby preventing the roadside object from being misidentified as an obstacle owing to erroneous recognition of it having intruded into the travel path of the subject vehicle when detecting the object using an electromagnetic beam.

DESCRIPTION OF SYMBOLS

10 vehicle (subject vehicle). 10a travel path, 12 engine (internal combustion engine), 16 front wheels, 20 rear wheels, 22 warning device, 34 brakes, 36 brake switch, 38 ECU (Electronic Control Unit), 40 electric motor, 42 radar unit, 44 radar output processing ECU. 46 wheel speed sensors, 50 steering wheel, 52 steering angle sensor, 54 yaw rate sensor, 60 crank-angle sensor, 62 manifold absolute pressure sensor, 64 throttle opening sensor, 70 navigation device, 100 roadside object (pole), 102 preceding vehicle (vehicle ahead), 104 regions

The invention claimed is:

1. An object detection apparatus for a vehicle comprising:
   a radar device configured to transmit an electromagnetic beam forward of a subject vehicle and project reflection points obtained onto a two-dimensional plane; and
   an obstacle determiner configured to determine whether an object detected based on the reflection points projected onto the two-dimensional plane is an obstacle constituting an obstruction to advance of the subject vehicle, the obstacle determiner comprising:
   a subject vehicle travel path estimator configured to estimate a travel path of the subject vehicle;
   a roadside object/preceding vehicle detector configured to detect a roadside object present at a side of the travel path and a preceding vehicle traveling ahead on the travel path at a speed equal to or greater than a predetermined speed by using the reflection points; and
   a roadside object movement determiner configured to determine, when the preceding vehicle passes the roadside object, whether a reflection point of the roadside object has moved toward the travel path of the subject vehicle on the two-dimensional plane within a predetermined time before and after the preceding vehicle passing the roadside object due to moving of the reflection point of the roadside object to a side of a reflection point of the preceding vehicle on the two-dimensional plane;
   wherein the obstacle determiner is configured to determine the roadside object not to be the obstacle when the reflection point of the roadside object is determined to have moved toward the travel path.

2. The apparatus according to claim 1, wherein the roadside object movement determiner is configured to establish regions at rear left and rear right of the preceding vehicle and determine whether the roadside object has moved toward the travel path within the established regions, and the obstacle determiner determines the roadside object not to be the obstacle when the roadside object is determined to have moved toward the travel path within the regions.

3. The apparatus according to claim 2, wherein the roadside object movement determiner establishes the regions at the rear left and rear right of the preceding vehicle so as to avoid an area directly behind the preceding vehicle.

4. The apparatus according to claim 1, wherein the obstacle determiner is configured to correct a determined moving speed of the roadside object to zero and correct a determined position of the roadside object to a position before movement was detected when it is determined that the reflection point of the roadside object has moved toward the travel path.

5. The apparatus according to claim 2, wherein the roadside object movement determiner is configured to determine a degree of width of a driving lane where the travel path of the subject vehicle is present and establish an area of the regions based on the determined width degree.

* * * * *